United States Patent

[11] 3,599,531

| [72] | Inventors | Norbert L. Wright<br>Park Ridge;<br>John W. Grek, Lisle, both of, Ill. |
|---|---|---|
| [21] | Appl. No. | 800,441 |
| [22] | Filed | Feb. 19, 1969 |
| [45] | Patented | Aug. 17, 1971 |
| [73] | Assignee | Continental Can Company, Inc.<br>New York, N.Y. |

[54] RECIPROCATING MARGIN-FINISHING APPARATUS
4 Claims, 3 Drawing Figs.

[52] U.S. Cl. ..................................................... 90/14,
90/11 R, 90/11.64, 51/34 C
[51] Int. Cl. ..................................................... B23c 3/12,
B24b 9/00
[50] Field of Search........................................90/14, 11.4,
11.64, 11; 51/34.2, 34.9, 166.7; 29/76

[56] References Cited
UNITED STATES PATENTS

| 969,388 | 9/1910 | Miles | 90/11.64 |
| 1,520,713 | 12/1924 | Hanson | 90/11.64 X |
| 2,655,768 | 10/1953 | Bartell | 51/166 (.7) X |
| 2,675,602 | 4/1954 | Kern | 51/34 (.2) |
| 2,732,771 | 1/1956 | Kerns | 51/34 (.2) X |

*Primary Examiner*—Gil Weidenfeld
*Attorneys*—Americus Mitchell, Joseph E. Kerwin and William A. Dittmann ABSTRACT: A reciprocating margin-finishing apparatus for applying the side of a rotating burr tool along the margin of a piece of flexible flat stock. To avoid wear of the burr tool in a restricted area, the burr tool is reciprocated along its longitudinal axis by reciprocating the high-speed motor which turns it. The motor is mounted on a slide element and the slide element is reciprocated by a constant feed cam to distribute wear evenly across the cutting edge of the burr tool.

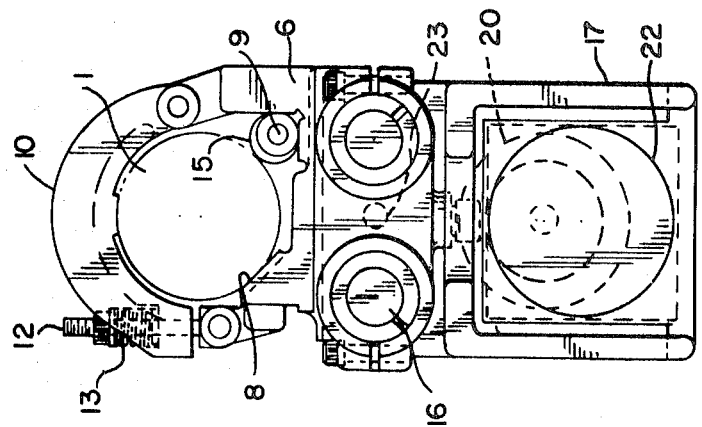
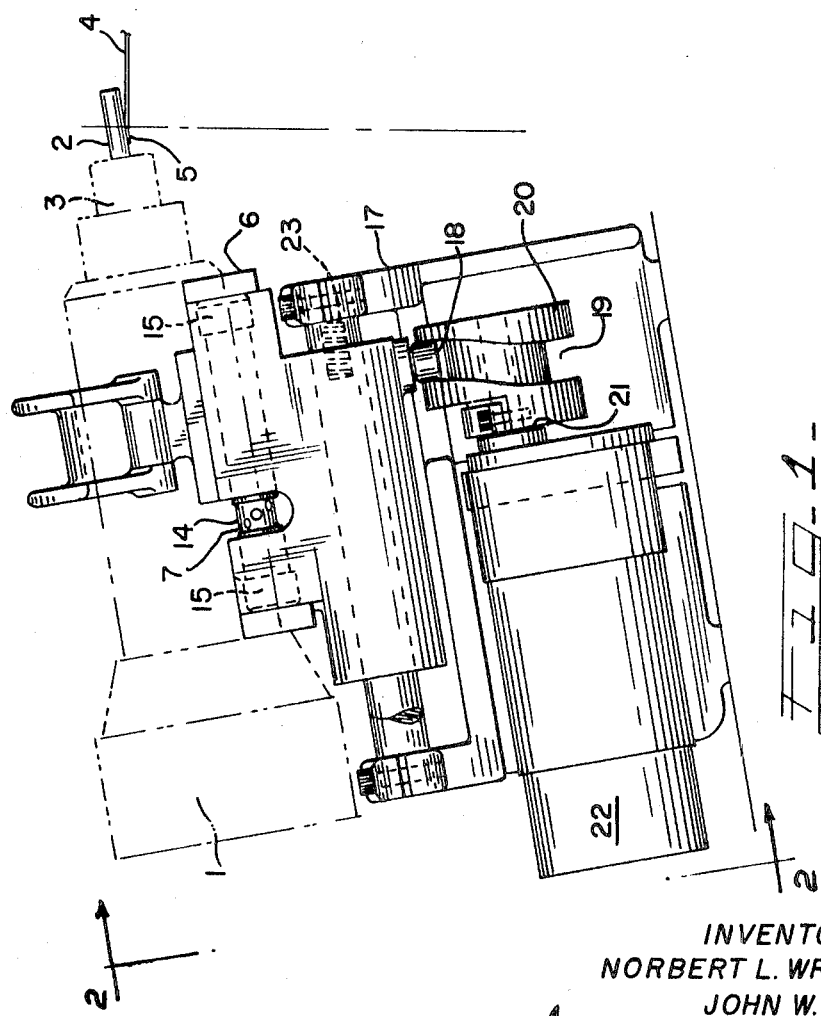
INVENTORS
NORBERT L. WRIGHT
JOHN W. GREK

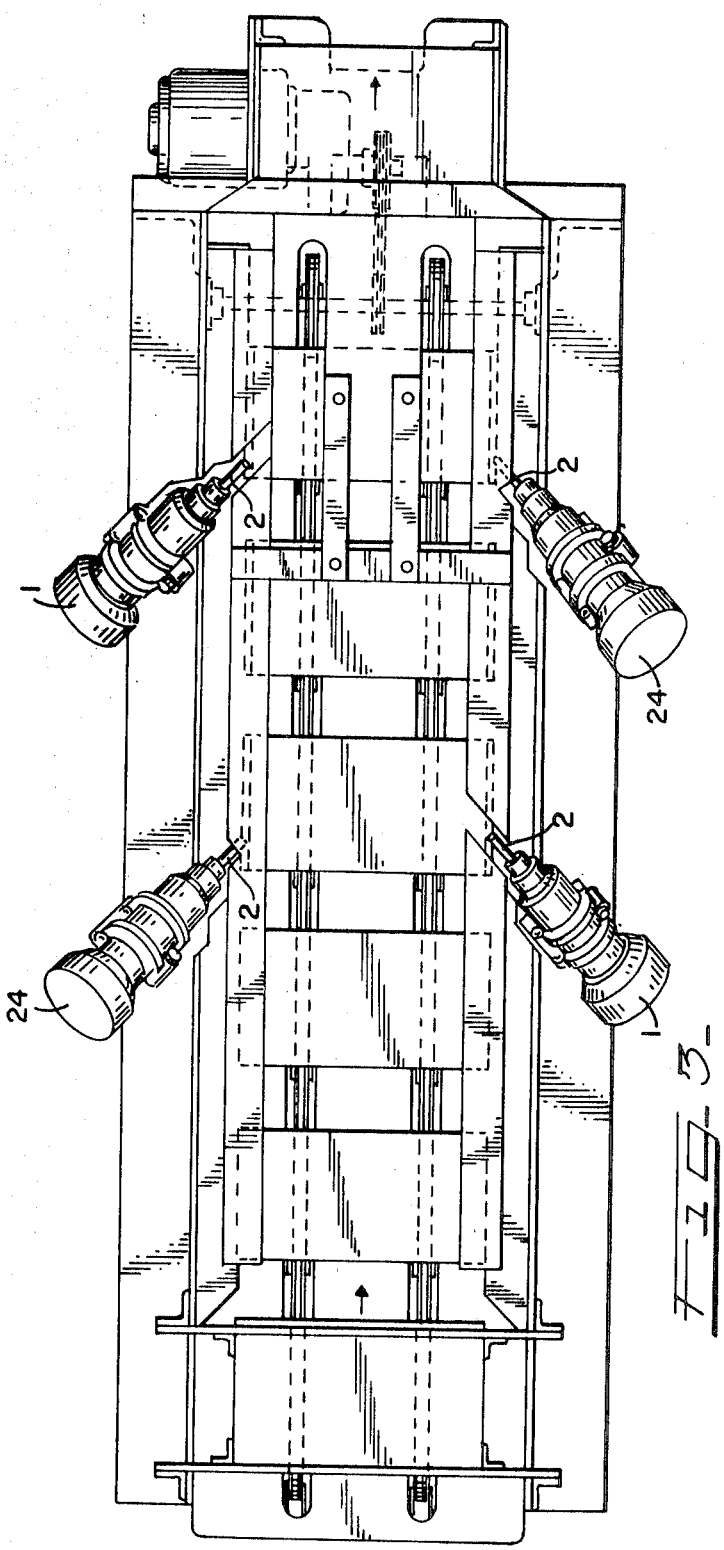

RECIPROCATING MARGIN-FINISHING APPARATUS

Our invention is to a reciprocating apparatus for finishing the margins of flat stock and particularly to a reciprocating margin-finishing apparatus for finishing can stock margins.

In the prior art, the edge portions of tubular can bodies have been cleaned by rotary file members which are disposed along the path of the edge of the blanks and extend into contact with the edge portions of the blank. Rotary file members are disposed angularly with respect to the direction of motion of the edge portions and rotate in the same general direction as the direction of motion of the edge portions to provide climb cutting of the edge portions in contact therewith.

Rotary file members used as above are subject to an inordinate amount of wear at a particular part of the rotary file. File wear is concentrated in the area of contact between the rotary files and the margin of the sheet metal. Also, the files may clog up with cuttings.

Another method for cleaning workpiece edge portions is by the use of abrasive wheels. The thin metallic blank to be cleaned passes between the abrasive wheels and is cleaned as the rotary wheels abrade the undesired material from the surface of the metallic blank.

It is a primary object of our invention to provide an apparatus for cleaning workpiece edge portions while a workpiece is being conveyed along a predetermined path.

It is another object of our invention to distribute the wear evenly along the surface of the rotary file or burr tool.

It is another object of our invention to provide an easily maintained long-life reciprocating margin finishing apparatus.

In brief, our invention is to an apparatus located along the path of travel of the edge portion of a metal sheet such as a can body blank. The apparatus has a high-speed motor which turns a burr tool at several thousand revolutions per minute. The high-speed motor is mounted upon a slide. The slide is movable in the direction of the axis of the high-speed motor. A slowly rotating cam imparts a reciprocatory motion to the high-speed motor along its longitudinal axis. The high-speed motor and burr tool are reciprocated back and forth across the margin of the can blank. Between the high-speed motor and the slide is an eccentric cam which is used to move the high-speed motor up or down, depending upon the stage of wear of the burr tool and to vary the width of the margin.

The objects, advantages, and uses of the invention will become apparent by making reference to the drawings, the claims, and the following detailed description of a preferred embodiment.

FIG. 1 shows a plan view of the margin-finishing apparatus;
FIG. 2 shows a view taken along line 2–2 of FIG. 1;
FIG. 3 shows the device of FIGS. 1 and 2 in operation showing the top plan view of a can body blank edge cleaning apparatus.

Our apparatus is essentially an improvement of the apparatus embodied in the patent application entitled "Method and Apparatus for Cleaning Workpiece Edges" by Anthony J. Cuma and Kenneth W. Mauer, Ser. No. 711,749, filed March 8, 1968, and assigned to the assignee of the present invention.

The embodiment of our invention as shown in FIG. 1 has a high-speed motor or power quill motor 1 with a rotary file or burr tool 2 fastened in its chuck 3. The rotary burr tool 2 is mounted on the shaft of the high-speed motor. This high-speed motor 1 operates, for example, at a speed between about 40,000 to 55,000 r.p.m. if a ¼-inch-diameter burr tool is used. When the burr tool 2 is pressed against the can body blank 4, all enamels, chromates, oxidations and any other foreign matter that may be adhering to the body blank are removed from the can body blank marginal area 5.

The motor 1 is fastened to a movable slide element 6 having a motor support bed 7. The motor support bed 7 (FIG. 2) has two bearing surfaces, one being a flat abutment 8 extending in the direction of motion of the slide, the other being an eccentric cam 9 which contacts the motor 1 at two points. A clamping member 10 passes almost entirely around the motor and has its ends fastened to opposite sides of the slide. One end of the clamping member 10 is pivotally fastened to one side of the slide while the other end 11 is fastened to the opposite side of the slide by a shaft 12 and a heavy compression spring 13.

A shaft 14 is journaled in a bracket located on the slide. The axis of the shaft lies in the direction of motion of the movable slide element 6. Eccentric cams 15 are connected to the shaft in such a manner that as the shaft is rotated, the eccentric cams 15 change the configuration of the motor mount bed to raise or lower the high-speed motor.

The clamp 10 and the eccentric cams 15 control the amount of pressure applied to the margin of the body blank 4 in the following way. When the motor 1 is mounted on the movable slide 6, and the burr tool 2 is applied to the margin 5 of the body blank, pressure is exerted between the tool 2 and the blank 4. The tool pressure may be increased by rotating the eccentric cam 15 which forms one of the motor supports. If one turns the eccentric so as to raise the motor, the amount of pressure exerted by the burr tool against the can body blank is lessened and the width of the cleaned area is narrowed. If the eccentric is turned sufficiently, the burr tool is raised completely away from the can body blank. Thus, no pressure will be exerted between the burr tool and the can body blank. However, if the eccentric 15 is turned to lower the burr tool against the can body blank margin, the pressure between the burr tool 2 and the body blank margin 5 is somewhat increased.

It is found necessary to increase the pressure between the burr tool and the body blank margin and to increase the width of the margin when the tool wears down or its cutting edge becomes somewhat dulled. After the burr tool has run for some time, it is usually necessary to have a greater pressure against the body blank margin in order to clean off the oxidation and other undesired materials to the extent necessary. The quill motor is lowered to clean a wider margin at the edge of the body blank.

The power quill motor is cradled in a V-type movable slide 6. The motor rests on two bearing surfaces which form the motor mount or motor support bed. One surface is the roller eccentric 15 described above, having a first bearing surface forward and a second to the rear. The other motor bearing surface 8 is a fixed surface located on the other side of the slide. As shown in this embodiment, the movable slide 6 is mounted on two shafts. The shafts 16 are fastened into a support bracket 17. An abutment 18 extends from the bottom of the slide and projects into a guideway 19 of a constant displacement barrel cam 20. The constant-displacement barrel cam is fastened to a shaft 21. The shaft is rotated slowly by a low-speed motor 22. As the low-speed motor 22 rotates the shaft 21, the abutment member 18 is moved forward and backward. Since the abutment member is fixedly connected to the movable slide, the movable slide reciprocates forward and backward as the shaft of the low-speed motor rotates. Spring 23 presses abutment member 18 firmly against one side of the cam guideway to avoid backlash.

Any of the variety of cams may be used to cause the reciprocation of the motor and tool. An offcenter cam may be used, for example. In the embodiment shown, the constant-displacement barrel cam 20 is used because a constant rate of turn of the cam imparts a constant rate of longitudinal displacement to the burr tool. The burr tool now wears evenly across its side rather than the wear being concentrated in one place or another. Since tool wear is spread across the surface of the cutting area of each burr tool, each tool has longer life in service. Adjustment is minimized.

Notwithstanding the reciprocation of the burr tool cutting edge back and forth across the margin of the can body blank, the cutting tool edge of the burr tool 2 does finally wear to some extent. After the machine has cleaned margin after margin, the pressure applied between the burr tool and the can body blank margin is not sufficient to press the dulled cutting edge against the blank and to clean all of the superfluous material from the can body blank margin. To clean the edge of the margin with a tool that has been dulled by long use requires the application of greater pressure between the tool and the margin than when the tool was sharp. As discussed above, increased pressure is applied by varying the eccentric cam and moving the quill motor toward the body blank margin. The heavy compression spring 13 presses the quill motor tightly against the motor bearing surface of the slide motor mount. The eccentric 15 is varied until the margin 5 of the can body blanks 4 passing the tool 2 are clean and of sufficient width to form a clean surface which may be used for welding, for example.

After the burr tool is worn to such an extent that adjustment of the eccentric cam in the slide does not produce enough pressure to clean can body blank margins thoroughly, then the machine is stopped briefly and a new burr tool is inserted in the chuck of the power quill motor. The new burr tool is adjusted up or down to regulate the pressure between it and the can body blank to give the proper amount of cleaning to the margin of the edges which are being passed through the machine.

Compression spring 13 holds the motor 1 tight enough to maintain its position relative to the slide in normal usage. Should a malfunction occur, the motor slides on the motor mount bearing surfaces sufficiently to prevent damage to the high-speed quill motor or the slow speed reciprocating motor.

A margin preparation machine (FIG. 3) typically has four margin-finishing apparatuses, such as ours, mounted in pairs on each side of the blank. One motor 24 of each pair cleans the top margin 5 of a blank 4 while the other motor 1 and burr tool 2 clean the bottom margin of a blank.

There are several advantages to this machine over the prior art. This machine gives almost full-time production with very little time out of production for adjustment and retooling. The burr tool wear is almost uniform across its cutting base. The life of the burr tool is extended. The effect of the can margin cleaning is more uniform between successive can margins than in former edge margin cleaning devices. Finally, the can margins are more thoroughly cleaned than in former machines.

The foregoing is a description of an illustrative embodiment of the invention, and it is applicants' intention in the appended claims to cover all forms which fall within the scope of the invention.

What we claim is:
1. A reciprocating margin-finishing apparatus for finishing the margins of flat stock comprising:
    a motor for turning a burr tool at a high number of revolutions per minute;
    a slide means having a movable element slideable upon a fixed element;
    means for positioning said motor relative to said movable element of said slide;
    means for positioning said fixed element upon a support,
    a slow-speed motor fixedly attached to said support,
    a barrel cam having a displacement groove mounted on the shaft of said slow-speed motor, and
    means connecting said displacement groove to said movable element whereby said burr tool is moved back and forth across said flat stock margin so that the wear on the burr tool is distributed along its cutting edge.
2. A reciprocating margin-finishing apparatus for finishing the margins of flat stock as set forth in claim 1 in which:
    said connecting means comprises:
    an abutment element fastened to said movable slide element and adapted to fit into said groove of said barrel cam whereby said movable slide element reciprocates carrying said motor and said tool with it when said slow-speed motor turns said barrel cam.
3. A reciprocating margin finishing apparatus for finishing the margins of flat stock as set forth in claim 2 in which:
    said barrel cam has a constant displacement groove whereby the rate of relative displacement between said movable slide element and the lower fixed element is constant to cause evenly distributed wear across the burr tool cutting area.
4. A reciprocating margin finishing apparatus for finishing the margins of flat stock as set forth in claim 1 in which:
    said means for positioning said motor relative to said slide further comprises:
    eccentric cam means mounted on said movable slide for varying the vertical position of said high-speed motor relative to said movable slide.